(12) United States Patent
Nakayama et al.

(10) Patent No.: US 11,728,069 B2
(45) Date of Patent: Aug. 15, 2023

(54) COAXIAL CABLE

(71) Applicant: TOTOKU ELECTRIC CO., LTD., Tokyo (JP)

(72) Inventors: Takeyasu Nakayama, Ueda (JP); Hiroto Imamura, Ueda (JP); Satoshi Yamazaki, Ueda (JP)

(73) Assignee: TOTOKU ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/745,118

(22) Filed: May 16, 2022

(65) Prior Publication Data
US 2023/0105524 A1     Apr. 6, 2023

(30) Foreign Application Priority Data
Oct. 5, 2021    (JP) .................................. 2021-163787

(51) Int. Cl.
*H01B 7/24* (2006.01)
*H01B 9/04* (2006.01)

(52) U.S. Cl.
CPC ................. *H01B 7/24* (2013.01); *H01B 9/04* (2013.01)

(58) Field of Classification Search
CPC .. H01B 13/20; H01B 13/202; H01B 11/1856; H01B 11/1834
See application file for complete search history.

(56) References Cited

U.S. PATENT DOCUMENTS

| | | | | |
|---|---|---|---|---|
| 2,648,719 A * | 8/1953 | Smith | ................ | H01B 11/1834 174/111 |
| 3,912,850 A * | 10/1975 | Bruno | ................ | H01B 11/1834 333/263 |
| 5,569,876 A * | 10/1996 | Podgorski | ................ | H01B 9/04 174/137 R |
| 5,922,155 A * | 7/1999 | Clouet | ................ | H01B 13/148 156/244.12 |
| 8,618,417 B2 * | 12/2013 | Perez | ..................... | H01B 3/445 174/110 SR |
| 10,718,918 B1 * | 7/2020 | Evans | ................ | H01B 11/1834 |
| 2005/0230145 A1 * | 10/2005 | Ishii | .................... | H01B 11/1834 174/113 AS |
| 2011/0056724 A1 * | 3/2011 | Tanaka | ................. | H01B 13/202 174/102 R |

(Continued)

FOREIGN PATENT DOCUMENTS

JP            5255529 B1    8/2013

*Primary Examiner* — Hoa C Nguyen
*Assistant Examiner* — Amol H Patel
(74) *Attorney, Agent, or Firm* — Manabu Kanesaka

(57) ABSTRACT

A coaxial cable 10 includes a hollow-core-body 1 having an integral structure of thermoplastic resin including an inner annular portion 2 that insulation-coats an inner conductor 12, a plurality of rib portions 3 that radially extend from the inner annular portion 2, and an outer annular portion 4 that is connected to outer ends of the rib portions 3; three or more gap portions 5 surrounded by the inner annular portion 2, the rib portions 3, and the outer annular portion 4; and outer side reinforcing portions 7 being formed on both sides of an outer end in the rib portion 3, in which a size ratio of a minimum value W1 of a rib width in the rib portion 3 and a maximum value W2 of the rib width in the rib portion 3 is within a range of 1:1.6 to 1:3.0.

1 Claim, 4 Drawing Sheets

(56) References Cited

U.S. PATENT DOCUMENTS

| | | | |
|---|---|---|---|
| 2014/0299349 A1* | 10/2014 | Yamaguchi | H01B 11/20 174/102 R |
| 2015/0075840 A1* | 3/2015 | Yamaguchi | H01B 7/04 174/113 A |
| 2016/0093419 A1* | 3/2016 | Shin | H01B 3/441 174/107 |

* cited by examiner

COAXIAL CABLE

CROSS-REFERENCE TO RELATED APPLICATION

This application is based upon and claims the benefit of priority of the prior Japanese Patent Application No. 2021-163787, filed on Oct. 5, 2021, and the entire contents of which are incorporated herein by reference.

TECHNICAL FIELD

The present invention relates to a coaxial cable.

BACKGROUND ART

Conventionally, a coaxial cable provided with a hollow-core-body has been known (PTL 1: Japanese Patent No. 5255529).

SUMMARY OF INVENTION

Technical Problem

Electronic equipment that is mounted on mobile communication apparatuses is becoming smaller and higher in density with the use in the high frequency band. Along with that, coaxial cables to be used in the electronic equipment are also used in the higher frequency band than the conventional one, and are required to have a smaller diameter. Under such a status, when a coaxial cable having a small diameter is wired in the inside of a compact antenna, it has been found recently that a hollow-core-body may be crushed by the lateral pressure.

Solution to Problem

The present invention is made in view of the abovementioned circumstances, and aims to provide a coaxial cable provided with a hollow-core-body having a configuration in which the lateral pressure strength is increased higher than that in the conventional structure while maintaining the stable high frequency transmission performance.

The present invention has been accomplished under the solutions as disclosed below.

A coaxial cable according to the present invention includes a hollow-core-body having an integral structure of thermoplastic resin including an inner annular portion that insulation-coats an inner conductor, a plurality of rib portions that radially extend from the inner annular portion, and an outer annular portion that is connected to outer ends of the rib portions; three or more gap portions surrounded by the inner annular portion, the rib portions, and the outer annular portion; and outer side reinforcing portions that are formed on both sides of the outer end in the rib portion, a rib width in the rib portion being a minimum value in a circumferential direction at a position close to the inner annular portion, the rib width in the rib portion being a maximum value in the circumferential direction at the outer end, and a size ratio of the minimum value and the maximum value being 1:1.6 to 1:3.0, wherein the hollow-core-body includes inner side reinforcing portions that are smaller than the outer side reinforcing portions and are formed on both ends of an inner end to be connected to the inner annular portion in the rib portion.

With the configuration, the configuration in which the lateral pressure strength is increased higher than that in the conventional structure while maintaining the stable high frequency transmission performance can be attained. In other words, when a current flows into the inner conductor, an electric field is formed in the surrounding of the inner conductor. The electric field strength at this time becomes stronger as being closer to the inner conductor, and becomes weaker as moving away further from the inner conductor. Therefore, the outer side reinforcing portions are provided on both sides of the outer end in each rib portion of the hollow-core-body, whereby the strength of the hollow-core-body functioning as an insulation sheathing body can be improved. In addition, the dielectric constant in the vicinity of the inner conductor does not change but remains in a low state, whereby the stable high frequency transmission performance can be maintained. The shape of the outer side reinforcing portion can include a circular arc shape, a triangular shape, a shape in which triangular shapes are combined viewed in a transverse cross-section, and other known overlay shapes.

Advantageous Effects of Invention

With the present invention, a coaxial cable provided with a hollow-core-body having a configuration wherein the lateral pressure strength is increased higher than that in the conventional structure while maintaining the stable high frequency transmission performance can be implemented.

DESCRIPTION OF EMBODIMENTS

Figure 1:
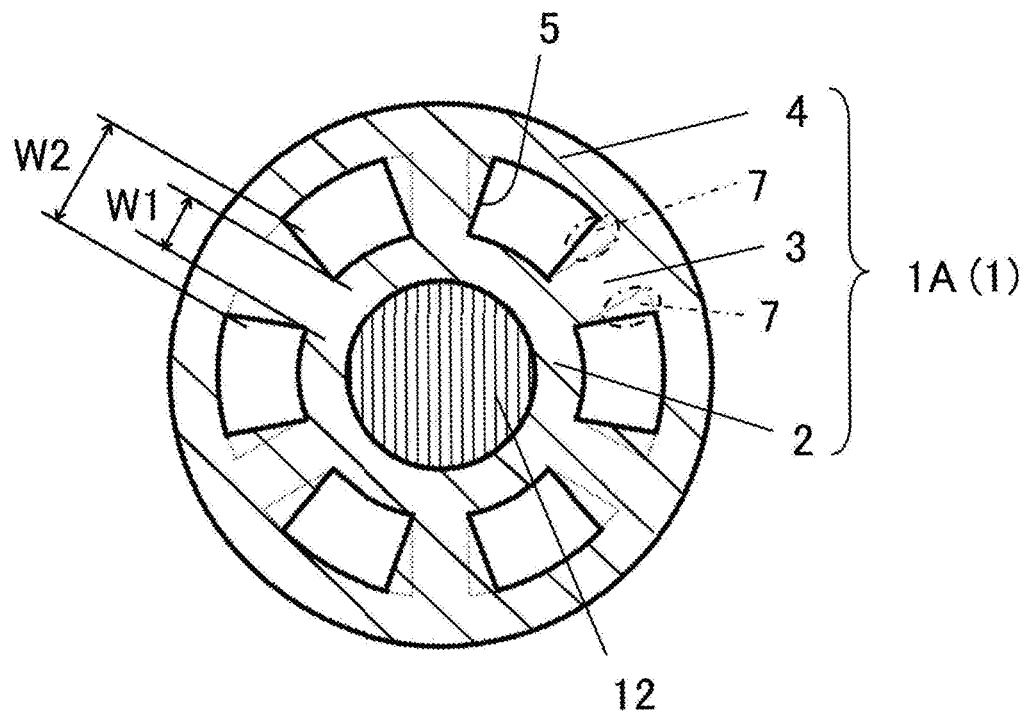
FIG. 1 is a transverse cross-sectional view schematically illustrating a first example of a hollow-core-body according to an embodiment of the present invention.

Hereinafter, an embodiment of the present invention will be described in detail with reference to the drawings. A coaxial cable 10 provided with a hollow-core-body 1 according to the present embodiment is applied to, as one example, a cable for signal transmission that is wired in an inside of an antenna corresponding to 5G and an inside of an antenna corresponding to 6G. Note that, in all the drawings for explaining the embodiment, elements having the same functions are assigned with the same reference numerals, and repeated explanations thereof are omitted in some cases.

[Coaxial Cable]

The coaxial cable 10 will be described below based on FIGS. 7A to 7C.

Figure 7A:
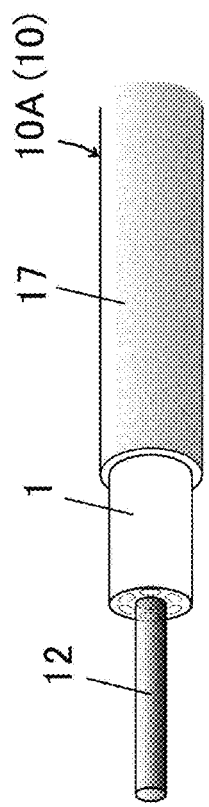
FIG. 7A is a schematic structural view illustrating a first example of the coaxial cable.

FIG. 7A illustrates a coaxial cable 10A as a first example, and a configuration in which an inner conductor 12 is insulation-coated with the hollow-core-body 1, and an outer conductor is obtained by providing a seamless metal pipe 17 to an outer circumference of the hollow-core-body 1. Note that, in addition to the abovementioned configuration, an insulating sheath is provided to an outer circumference of the metal pipe 17 in some cases.

Figure 7B:
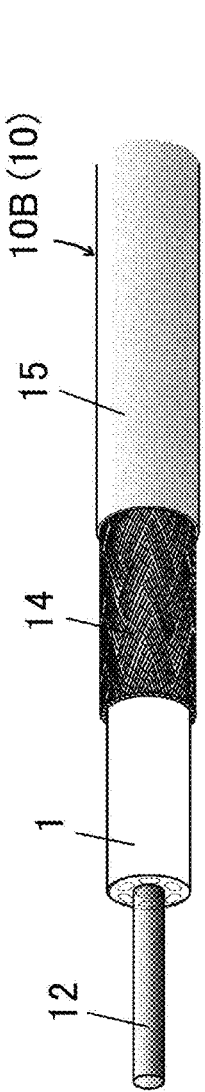
FIG. 7B is a schematic structural view illustrating a second example of the coaxial cable.

FIG. 7B illustrates a coaxial cable 10B as a second example, in which the inner conductor 12 is insulation-coated with the hollow-core-body 1, an outer conductor is obtained by providing a braided wire 14 including metal strands to the outer circumference of the hollow-core-body 1, and an insulating sheath 15 is provided to an outermost circumference thereof.

Figure 7C:
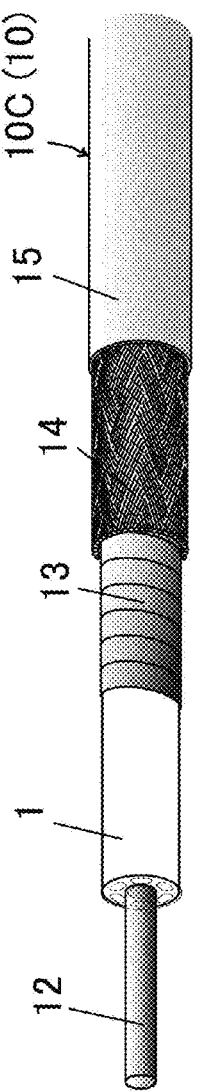
FIG. 7C is a schematic structural view illustrating a third example of the coaxial cable.

FIG. 7C illustrates a coaxial cable 10C as a third example, and a configuration in which the inner conductor 12 is insulation-coated with the hollow-core-body 1, and an outer conductor is obtained by spirally winding a metal foil 13 around the outer circumference of the hollow-core-body 1 and providing the braided wire 14 including metal strands to an outer circumference of the metal foil 13. The insulating sheath 15 is disposed to the outermost circumference.

As for the inner conductor 12, copper or a copper alloy, a copper coating steel wire, aluminum or an aluminum alloy, and a composite material such as copper clad aluminum, or these materials plated with metal excellent in soldering property are applied. As one example, the inner conductor 12 is a silver-plating annealed copper wire or an annealed copper wire. The inner conductor 12 is not limited to a single wire, but a stranded wire can be used. As one example, a copper wire is subjected to wire-drawing to obtain the round inner conductor 12 having a circular or elliptical cross section.

The hollow-core-body 1 includes insulating resin that can be formed by melting, and is, as one example, fluorine-based resin or polyolefin-based resin.

The outer conductor includes the metal pipe 17 provided to the outer circumference of the hollow-core-body 1, the metal foil 13 spirally wound or vertically attached thereto, a resin tape for shock absorption, or the braided wire 14 including metal strands or laterally wound metal strands, or these are used in a composite manner. As for the metal foil 13, stainless steel, a nickel alloy, copper or a copper alloy, aluminum or an aluminum alloy, a composite material thereof, or the like is used. The braided wire 14 is a braided wire, and stainless steel, a nickel alloy, copper or a copper alloy, aluminum or an aluminum alloy, a composite material thereof, or the like is used for a metal strand. The sheath 15 is an outer cover for insulation from the outside, and configures an outermost layer in the coaxial cable 10. The sheath 15 includes, as one example, FEP that is fluorine-based resin.

As a configuration other than the abovementioned configuration, as one example, the metal foil 13 is vertically attached in some cases. As one example, laterally wound metal strands are used in some cases. Therefore, the outer conductor includes the metal pipe 17 provided to the outer circumference of the hollow-core-body 1, the metal foil 13 spirally wound or vertically attached, a resin tape for shock absorption, or the braided wire 14 including metal strands or laterally wound metal strands, or these are used in a composite manner.

[Hollow-Core-Body]

The hollow-core-body 1 will be described below based on FIGS. 1 to 5.

FIG. 1 illustrates a hollow-core-body 1A as a first example in which an inner annular portion 2 that insulation-coats the inner conductor 12, a plurality of rib portions 3 that radially extend from the inner annular portion 2, and an outer annular portion 4 that is connected to outer ends of the rib portions 3 are made as an integral structure of thermoplastic resin. In the hollow-core-body 1A, gap portions 5 surrounded by the inner annular portion 2, the rib portions 3, and the outer annular portion 4 are formed in three or more locations in a circumferential direction. In this example, the gap portions 5 are formed in six locations. The thermoplastic resin is fluorine-based resin or polyolefin-based resin. Preferable fluorine-based resin can include a fluorinated resin copolymer (Perfluoro alkoxy fluororesin: PFA) and the like.

In the hollow-core-body 1A illustrated in FIG. 1 as the first example, outer side reinforcing portions 7 are respectively formed in portions surrounded by dot-and-dash lines on both sides of outer ends in the rib portion 3. The outer side reinforcing portion 7 makes a space at the outer circumference side of the gap portion 5 narrow, and has a triangular-shaped overlay viewed in a transverse cross-section. The triangular shape that forms the outer side reinforcing portion 7 includes one side having a length equivalent to a total length of the columnar shape in the rib portion 3. A rib width in the rib portion 3 has a minimum value W1 of the rib width in the circumferential direction at a position closer to the inner annular portion 2, and a maximum value W2 of the rib width in the circumferential direction at the outer end. Here, a size ratio of the minimum value W1 of the rib width and the maximum value W2 of the rib width is within a range of 1:1.6 to 1:3.0.

Figure 2:
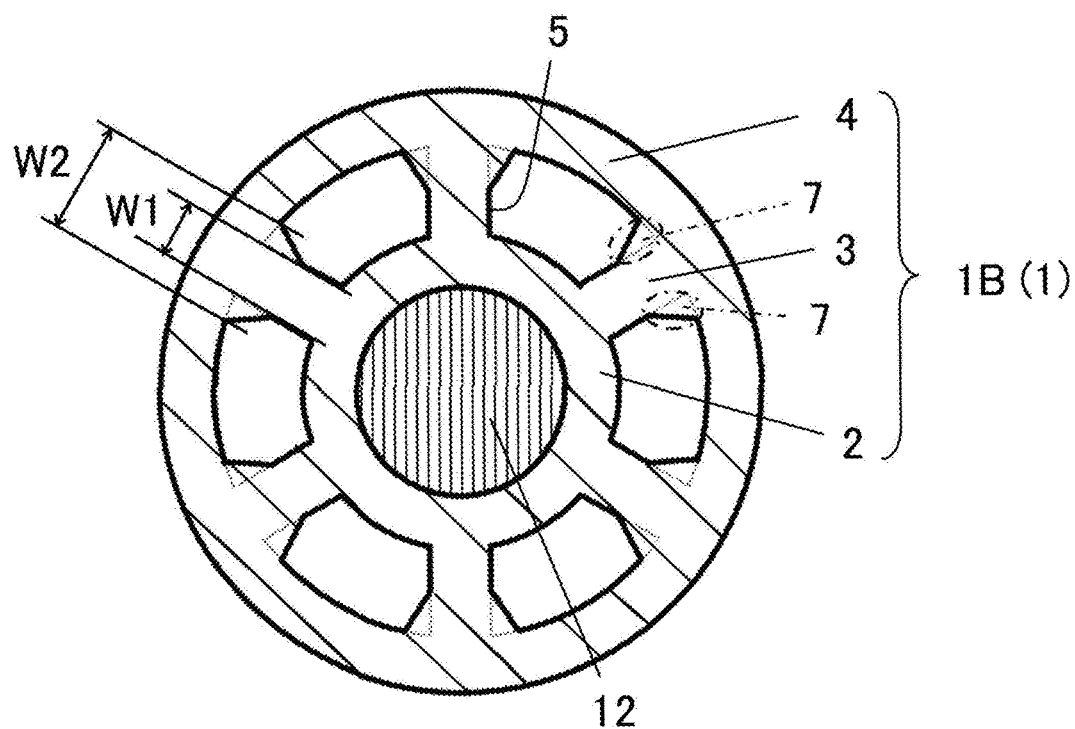
FIG. 2 is a transverse cross-sectional view schematically illustrating a second example of the hollow-core-body according to the embodiment of the present invention.

In a hollow-core-body 1B illustrated in FIG. 2 as a second example, the outer side reinforcing portions 7 are respectively formed in portions surrounded by dot-and-dash lines on both sides of the outer ends in the rib portion 3. The outer side reinforcing portion 7 makes a space at the outer circumference side of the gap portion 5 narrow, and has a triangular-shaped overlay viewed in a transverse cross-portion. Further, in the triangular shape that forms the outer side reinforcing portion 7, the length of one side of the outer side reinforcing portion 7 that comes into contact with the gap portion 5 in the rib portion 3 is 0.5 time the total length of the columnar shape of the rib portion 3. The second example is different from the first example in this point.

Figure 3:
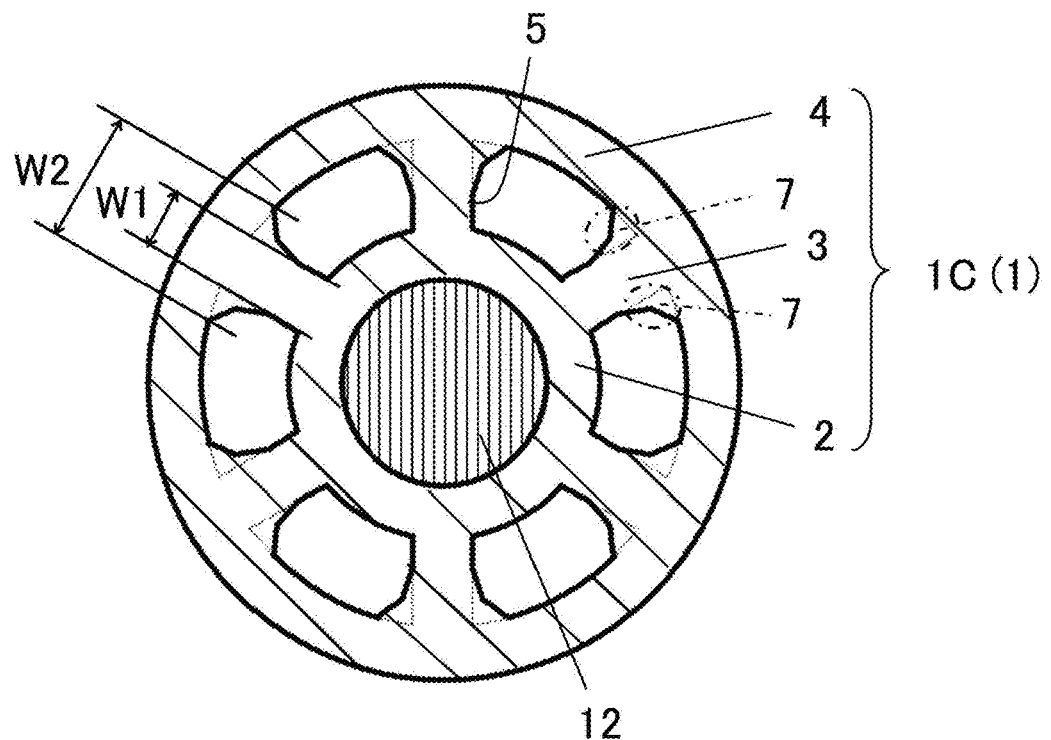
FIG. 3 is a transverse cross-sectional view schematically illustrating a third example of the hollow-core-body according to the embodiment of the present invention.

In a hollow-core-body 1C illustrated in FIG. 3 as a third example, the outer side reinforcing portions 7 are respectively formed in portions surrounded by dot-and-dash lines on both sides of the outer ends in the rib portion 3. The outer side reinforcing portion 7 makes a space at the outer circumference side of the gap portion 5 narrow, and has an overlay in which two triangular shapes are combined viewed in a transverse cross-section. Further, in the shape in which two triangular shapes are combined that forms the outer side reinforcing portion 7, the total length of two sides of the outer side reinforcing portion 7 that come into contact with the gap portion 5 in the rib portion 3 is 0.5 time the total length of the columnar shape of the rib portion 3. The third example is different from the first example in this point.

Figure 4:
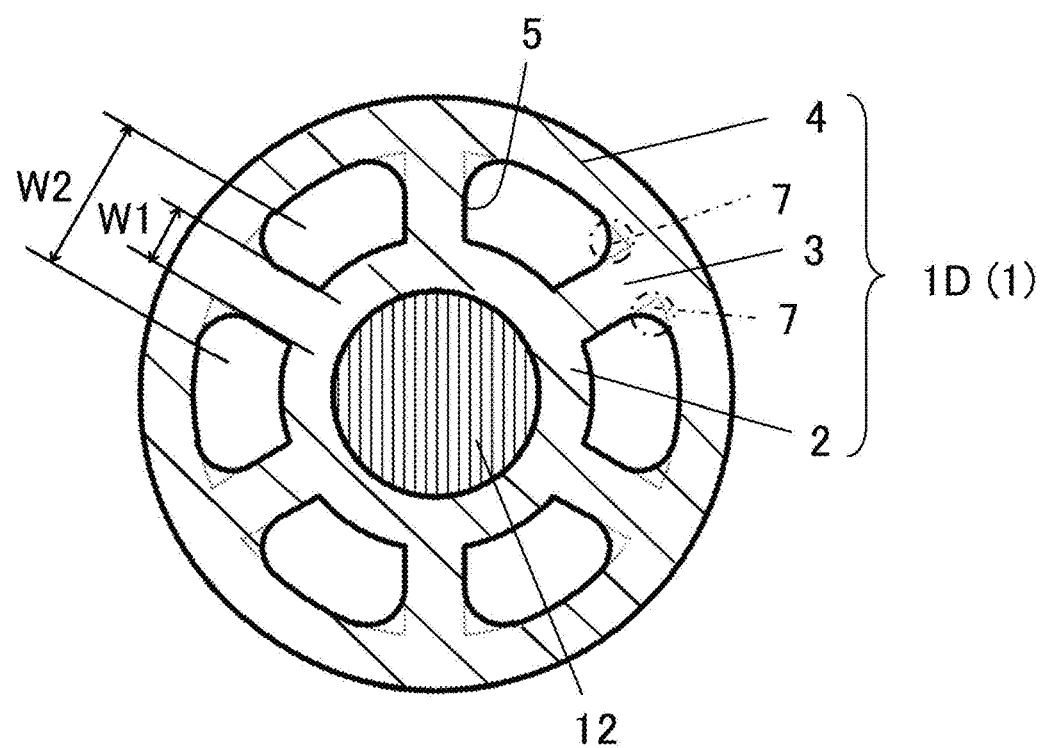
FIG. 4 is a transverse cross-sectional view schematically illustrating a fourth example of the hollow-core-body according to the embodiment of the present invention.

In a hollow-core-body 1D illustrated in FIG. 4 as a fourth example, the outer side reinforcing portions 7 are respectively formed in portions surrounded by dot-and-dash lines on both sides of the outer ends in the rib portion 3. The outer side reinforcing portion 7 makes a space at the outer circumference side of the gap portion 5 narrow, and has an R-shaped overlay viewed in a transverse cross-section. Further, in the R shape that forms the outer side reinforcing portion 7, the radius is 0.5 time the total length of the columnar shape of the rib portion 3. The fourth example is different from the first example in this point.

Figure 5:
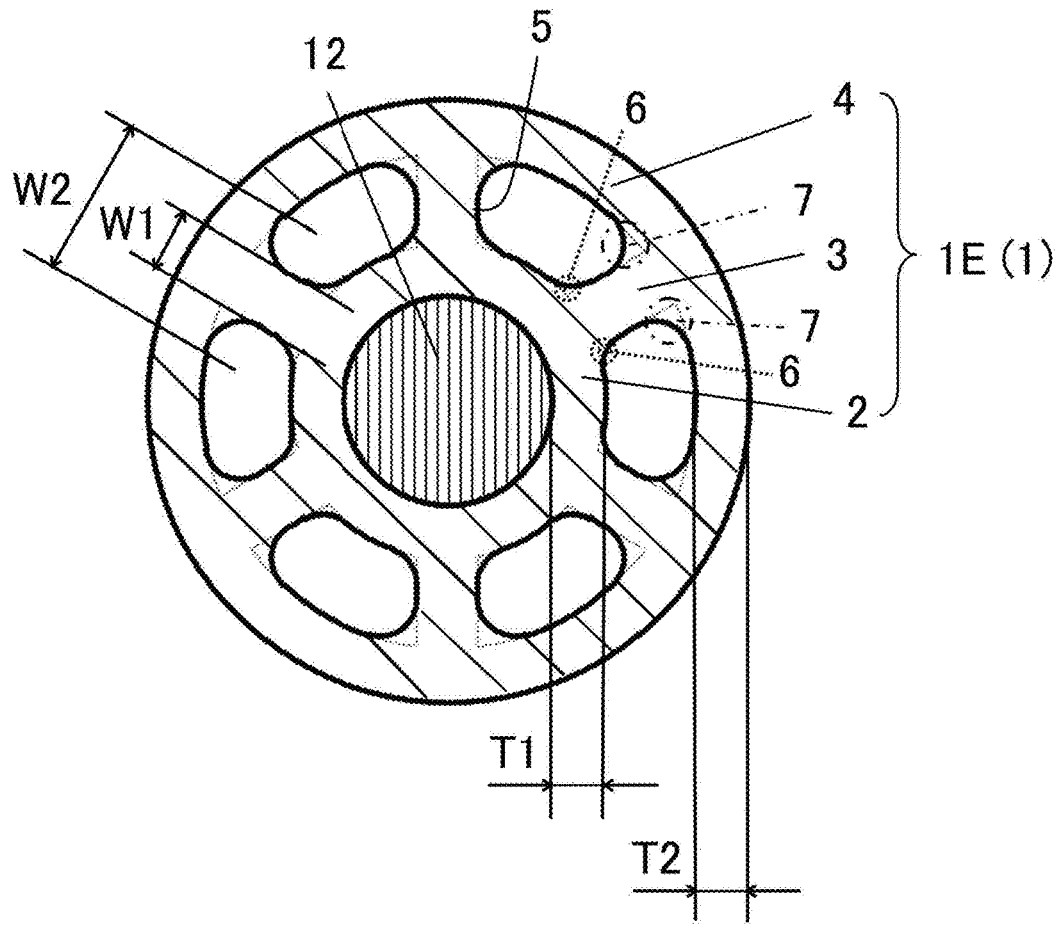
FIG. 5 is a transverse cross-sectional view schematically illustrating a fifth example of the hollow-core-body according to the embodiment of the present invention.

In a hollow-core-body 1E illustrated in FIG. 5 as a fifth example, the outer side reinforcing portions 7 are respectively formed in portions surrounded by dot-and-dash lines on both sides of the outer ends in the rib portion 3. Further, in the hollow-core-body 1E, inner side reinforcing portions 6 are respectively formed in portions surrounded by dashed lines on both sides of an inner end in the rib portion 3 that is connected to the inner annular portion 2. The outer side reinforcing portion 7 makes a space at the outer circumference side of the gap portion 5 narrow, and has an R-shaped overlay viewed in a transverse cross-section. In the R shape that forms the outer side reinforcing portion 7, the radius is 0.5 time the total length of the columnar shape of the rib portion 3. Further, the inner side reinforcing portion 6 makes a space at an inner circumference side of the gap portion 5 narrow, and has an R-shaped overlay viewed in a transverse cross-section. The R shape that forms the inner side reinforcing portion 6 has a size smaller than that of the R shape that forms the outer side reinforcing portion 7. If cross-sectional areas of the transverse cross-sections are compared, the size of the inner side reinforcing portion 6 is 0.2 time to 0.5 time the size of the outer side reinforcing portion 7. The fifth example is different from the first example in this point.

In the hollow-core-bodies 1A to 1E, the number of the gap portions 5 (the number of the rib portions 3) may be 3 or more, and can be set as appropriate in accordance with the hollow rate, the mechanical characteristics, and the like that are needed. Further, when the number of the gap portions 5 (the number of the rib portions 3) becomes 10 or more, the physical hollow rate becomes small, which may lower the electric characteristics. Therefore, the number of the gap portions 5 (the number of the rib portions 3) is preferably 3 to 9, more preferably 4 to 8, and specially preferably 6.

In the hollow-core-body 1 (the hollow-core-bodies 1A to 1E), a thickness T1 of the inner annular portion 2 is 15 to 70 μm, a thickness T2 of the outer annular portion 4 is 25 to 80 μm, the minimum value W1 of the rib width is 25 to 80 μm, and the maximum value W2 of the rib width is 37 to 240 μm. Further, the relations among the respective thicknesses are as follows: the thickness T2 of the outer annular portion 4 is larger than the thickness T1 of the inner annular portion 2 (T2>T1); the maximum value W2 of the rib width is larger than the minimum value W1 of the rib width (W2>W1); and the maximum value W2 of the rib width is equal to or larger than the thickness T2 of the outer annular portion 4 (W2≥T2). With the configuration, the coaxial cable 10 can have a rugged configuration while having a small diameter, so that when the coaxial cable 10 is wired in an inside of a compact antenna, the hollow-core-body 1 can be prevented from being crushed by the lateral pressure. Accordingly, a cable for signal transmission that is wired in the inside of the antenna corresponding to 5G or in the inside of the antenna corresponding to 6G can be preferably configured.

A manufacturing method of the hollow-core-body 1 according to the present embodiment uses a die including a center hole, an inner annular hole formed adjacent to an outer edge thereof so as to surround the center hole, three or more predetermined shape holes that radially extend from an outer circumference of the inner annular hole and each have a width wider than that of the inner annular hole, and an outer annular hole that connects outer ends of the predetermined shape holes and has a width wider than that of the inner annular hole. Further, while inserting the inner conductor into the center hole, molten resin is extruded from the inner annular hole, the predetermined shape holes, and the outer annular hole to form, in the surrounding of the inner conductor, the hollow-core-bodies 1A to 1E including the inner annular portion, the rib portions that radially extend from the inner annular portion, the outer annular portion that connects the outer ends of the rib portions, and the gap portions that are surrounded by the inner annular portion, the outer annular portion, and the rib portions and are continuous in a longitudinal direction.

With the manufacturing method of the hollow-core-body 1 according to the present embodiment, the thickness of the inner side portion that has an influence on the electric characteristics becomes thin, and the outer side portion that has a small influence on the electric characteristics becomes thick. Therefore, the hollow-core-bodies 1A to 1E having a high electric hollow rate and excellent in the mechanical strength, especially the lateral pressure strength, can be obtained. Accordingly, the coaxial cable 10 can be made to have a configuration in which the lateral pressure strength is increased higher than that in the conventional structure while maintaining the stable high frequency transmission performance.

[Lateral Pressure Test]

Figure 6:
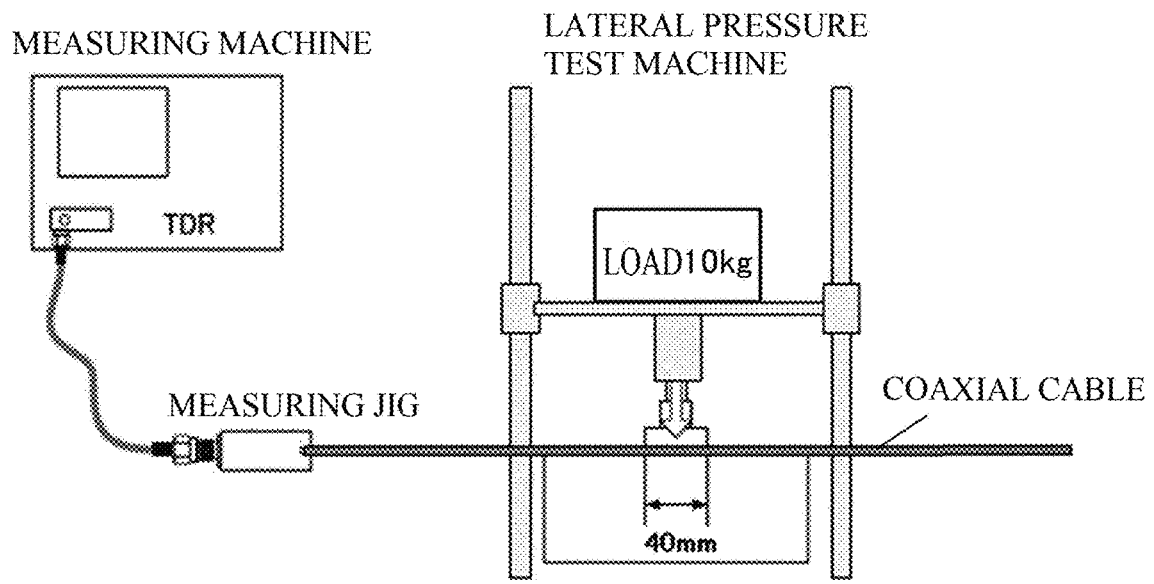
FIG. 6 is a view for schematically describing a lateral pressure test of a coaxial cable.

Subsequently, the lateral pressure test illustrated in FIG. 6 was performed with respect to the example of the coaxial cable 10B using the hollow-core-body 1E having a shape illustrated in the abovementioned fifth example and a comparative example of a coaxial cable of another company product. The number of samples is one for each example, and by using different measurement positions of the rib, the measurement was performed in six locations in the example and two locations in the comparative example. As the measurement timing, the measurement was performed after 30 minutes after the lateral pressure was applied to obtain a reference value and the measurement was performed after 3 minutes after the lateral pressure was released to obtain a change value, and a changing amount of the measurement values was evaluated. As the evaluation reference, OK was obtained when the changing amount of the transmission loss was within 10%, and NG was obtained when the changing amount of the transmission loss exceeded 10%. Moreover, OK was obtained when the changing amount of the impedance was within 1Ω, and NG was obtained when the changing amount of the impedance exceeded 1Ω. Table 1 illustrates evaluation results of the lateral pressure tests with respect to the respective samples.

TABLE 1

| Sample No. | Maximum value of rib width W2 [μm] | Minimum value of rib width W1 [μm] | W2/W1 | Lateral pressure test | |
|---|---|---|---|---|---|
| | | | | Transmission loss | Impedance |
| Example-1 | 122.4 | 66.2 | 1.85 | OK | OK |
| Example-2 | 114.4 | 70.2 | 1.63 | OK | OK |
| Example-3 | 154.4 | 68.6 | 2.25 | OK | OK |
| Example-4 | 145.4 | 71.0 | 2.05 | OK | OK |
| Example-5 | 123.4 | 73.5 | 1.68 | OK | OK |

TABLE 1-continued

| Sample No. | Maximum value of rib width W2 [μm] | Minimum value of rib width W1 [μm] | W2/W1 | Lateral pressure test | |
|---|---|---|---|---|---|
| | | | | Transmission loss | Impedance |
| Example-6 | 153.4 | 73.1 | 2.10 | OK | OK |
| Comparative example-1 | 80.0 | 57.4 | 1.39 | NG | NG |
| Comparative example-2 | 77.0 | 58.6 | 1.31 | NG | NG |

OK: changing amount≤±10%  OK: changing amount≤±1Ω

As illustrated in Table 1, in the examples, the changing amount of the transmission loss was within 10% and the changing amount of the impedance was within 1Ω, which were good results. Meanwhile, in the comparative examples, the changing amount of the transmission loss exceeded 10% and the changing amount of the impedance exceeded 1Ω, which indicate apparent degradation. In the examples, the size ratio of the minimum value W1 of the rib width and the maximum value W2 of the rib width was 1:1.6 or more. Meanwhile, in the comparative examples, the size ratio of the minimum value W1 of the rib width and the maximum value W2 of the rib width was 1:1.4 or less.

From the evaluation results of the lateral pressure tests, the size ratio of the minimum value W1 of the rib width and the maximum value W2 of the rib width is defined to 1:1.6 or more, whereby a configuration in which the lateral pressure strength is increased higher than that in the conventional structure can be obtained. Meanwhile, in order to maintain the physical hollow rate of the gap portion 5 and maintain the electric characteristics, the size ratio of the minimum value W1 of the rib width and the maximum value W2 of the rib width is preferably defined to 1:3.0 or less. Accordingly, it has been found that by setting the size ratio of the minimum value W1 of the rib width and the maximum value W2 of the rib width within the range of 1:1.6 to 1:3.0, the configuration in which the lateral pressure strength is increased higher than that in the conventional structure can be obtained while maintaining the stable high frequency transmission performance.

The present invention is not limited to the embodiment having been described above, but various changes can be made without deviating from the scope of the present invention.

What is claimed is:

1. A coaxial cable comprising:
a hollow-core-body having an integral structure of thermoplastic resin including an inner annular portion that insulation-coats an inner conductor, a plurality of rib portions that radially extend from the inner annular portion, and an outer annular portion that is connected to outer ends of the rib portions; three or more gap portions surrounded by the inner annular portion, the rib portions, and the outer annular portion; and outer side reinforcing portions that are formed on both sides of the outer end in the rib portion,
a rib width in the rib portion being a minimum value in a circumferential direction at a position close to the inner annular portion,
the rib width in the rib portion being a maximum value in the circumferential direction at the outer end, and a size ratio of the minimum value and the maximum value being 1:1.6 to 1:3.0,
wherein the hollow-core-body includes inner side reinforcing portions that are smaller than the outer side reinforcing portions and are formed on both ends of an inner end to be connected to the inner annular portion in the rib portion.

* * * * *